United States Patent

Navé

[11] Patent Number: 6,167,178
[45] Date of Patent: Dec. 26, 2000

[54] PLENUM RATED FIBER OPTIC CABLES

[75] Inventor: Samuel D. Navé, Conover, N.C.

[73] Assignee: Siecor Operations, LLC, Hickory, N.C.

[21] Appl. No.: 09/161,924

[22] Filed: Sep. 28, 1998

[51] Int. Cl.[7] .................................................. G02B 6/44
[52] U.S. Cl. ......................... 385/103; 385/100; 385/106; 385/113
[58] Field of Search ................................... 385/100–114

[56] References Cited

U.S. PATENT DOCUMENTS

| | | | |
|---|---|---|---|
| 4,456,654 | 6/1984 | Kotian | 428/383 |
| 4,500,748 | 2/1985 | Klein | 174/121 |
| 4,562,302 | 12/1985 | Checkland et al. | 174/118 |
| 4,664,472 | 5/1987 | Mayr et al. | 350/96.23 |
| 4,708,975 | 11/1987 | Shain | 523/216 |
| 4,716,073 | 12/1987 | Randa | 428/215 |
| 4,804,702 | 2/1989 | Bartoszek | 524/432 |
| 4,826,899 | 5/1989 | Rees | 524/94 |
| 4,941,729 | 7/1990 | Hardin et al. | 350/96.23 |
| 4,963,609 | 10/1990 | Anderson et al. | 524/413 |
| 4,994,549 | 2/1991 | Chiolle et al. | 528/272 |
| 5,001,304 | 3/1991 | Hardin et al. | 174/107 |
| 5,173,528 | 12/1992 | Chiolle et al. | 524/87 |
| 5,173,960 | 12/1992 | Dickinson | 385/100 |
| 5,296,648 | 3/1994 | Johnson | 174/117 |
| 5,378,856 | 1/1995 | Allen | 174/120 |
| 5,422,614 | 6/1995 | Rampalli et al. | 333/237 |
| 5,514,837 | 5/1996 | Kenny et al. | 174/113 |
| 5,576,515 | 11/1996 | Bleich et al. | 174/110 |
| 5,666,452 | 9/1997 | Deitz, Sr. et al. | 385/100 |
| 5,670,748 | 9/1997 | Gingue et al. | 174/120 |
| 5,698,323 | 12/1997 | Keough et al. | 428/379 |
| 5,739,473 | 4/1998 | Zerbs | 174/121 |
| 5,748,823 | 5/1998 | Navé | 395/113 |

FOREIGN PATENT DOCUMENTS

| | | | |
|---|---|---|---|
| 0 410 621 A1 | 1/1991 | European Pat. Off. | H01B 7/02 |
| 0 598 344 A1 | 5/1994 | European Pat. Off. | C08K 3/22 |
| 0 751 535 A2 | 1/1997 | European Pat. Off. | H01B 7/34 |
| 08220398 | 8/1996 | Japan | G02B 6/44 |

OTHER PUBLICATIONS

Siecor Product Information, Altos Riser Cables, Jul. 1997.
Siecor Product Information, Single–Fiber Cables, Jul. 1997.
Siecor Product Information, FREEDM/LST Cables (2–12 Fibers), Jul. 1997.
Siecor Product Information, Unitized MIC Cables (24–144 Plenum), Dec. 1997.
Siecor Product Information, MIC Cables (2–24 Plenum), Dec. 1997.
The 1987 National Electrical Code Requirements for Calbe, by Stanley Kaufman, AT&T Bell Laboratories, IWCS Proceedings 1986, pp. 545–553.

Primary Examiner—Phan T. H. Palmer
Attorney, Agent, or Firm—Timothy J. Aberle

[57] ABSTRACT

A fiber optic cable suitable for use in plenum applications comprising at least one optical fiber having a buffer layer formed of a flame retarded polyolefin material, a layer of strength members, and a cable jacket surrounding the optical fiber and in contact with at least some of the strength members. The flame retarded polyolefin can be selected from the group consisting of a flame retarded polyethylene, a flame retarded polypropylene, and blends thereof. Cables made according to the present invention are suitable for use in plenums of buildings, and are designed to meet mechanical and environmental requirements.

23 Claims, 1 Drawing Sheet

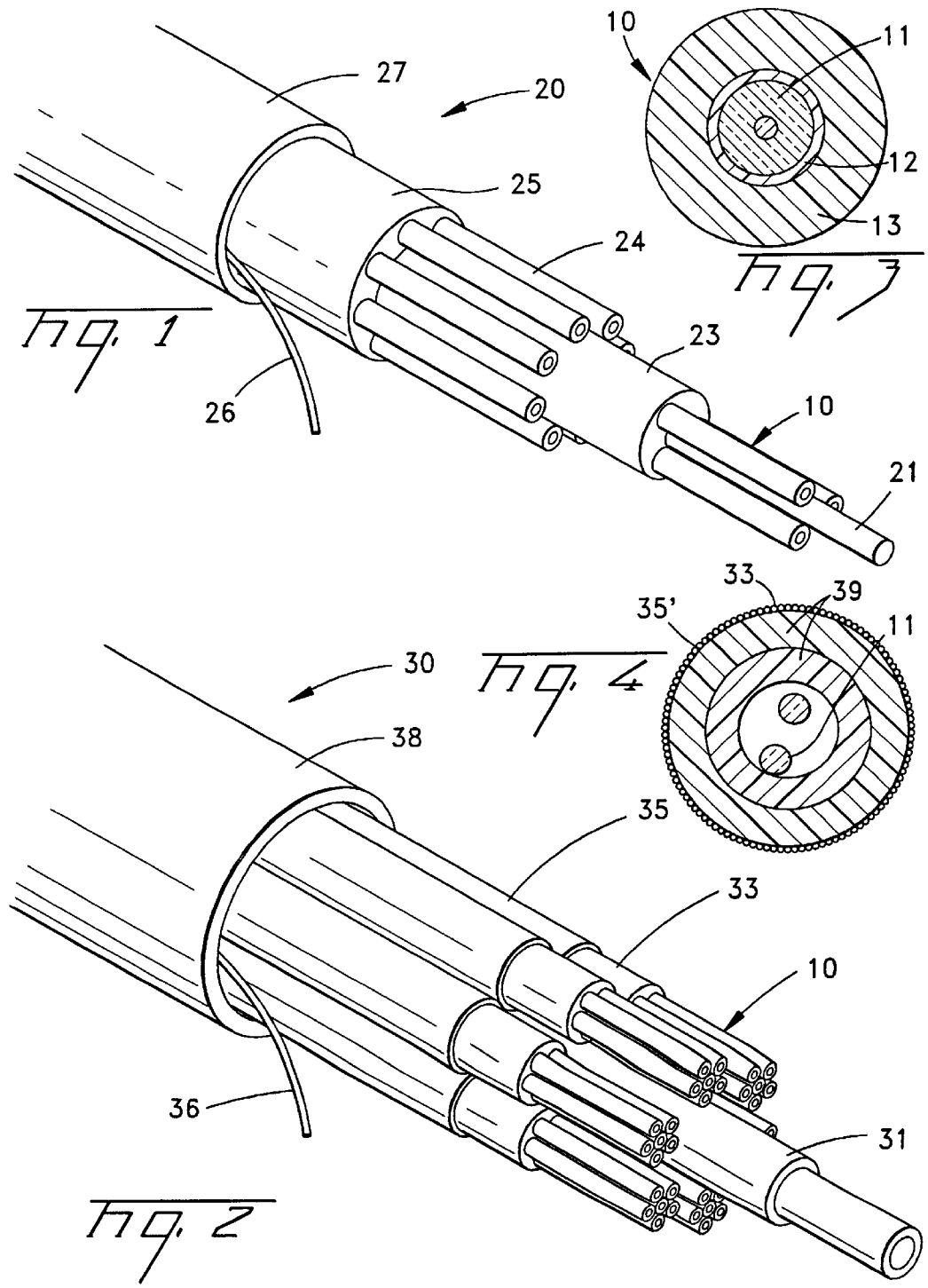

PLENUM RATED FIBER OPTIC CABLES

The present invention relates to a plenum rated fiber optic cable having a structure which meets flame, mechanical, and environmental requirements.

Conventional fiber optic cables comprise optical fibers which are used to transmit voice, video, and data information. Fiber optic cables may be required to meet mechanical and environmental tests, for example, as defined in Bellcore GR-409-Core, Issue 1, published May, 1994, and incorporated by reference herein. The mechanical tests of Bellcore GR-409-Core include, for example, tensile, compression, cycle flex, and impact tests. In addition, the mechanical tests of Bellcore GR-409-Core include, for example, temperature cycling and cable aging. Fiber optic is cables not able to withstand the rigors of the foregoing tests may be rejected by customers for certain applications. An example of a fiber optic cable which meets Bellcore GR-409-Core is disclosed in U.S. Pat. No. 5,627,932.

Indoor fiber optic cables have been developed for installation in plenums and risers, and/or ducts of buildings. In order for a fiber optic cable to be rated for riser or plenum use, the cable must meet flame retardance standards as determined by means of vertical or horizontal flame tests. Exemplary requirements for such tests have been established by Underwriters Laboratories (UL). Since riser cables are typically installed in vertical shafts, the relevant standard for riser rated fiber optic cables is embodied in UL 1666, a flame test in a vertical shaft without a forced air draft in the shaft. UL 1666 does not include a smoke evolution requirement. UL has promulgated the riser rating requirements in a document entitled "Test for Flame Propagation Height of Electrical and Optical-Fiber Cables Installed Vertically in Shafts", wherein values for flame propagation height are set forth. Examples of riser rated fiber optic cables are disclosed in U.S. Pat. No. 5,748,823 and EP-A1-0410621.

The relevant standard for plenum rated fiber optic cables is embodied in UL 910, a horizontal flame test setting forth flame propagation and smoke evolution requirements. In the construction of many buildings, a plenum can include, for example, a space between a drop ceiling and a structural floor above the drop ceiling. A plenum typically serves as a conduit for forced air in an air handling system, and the plenum is oftentimes a convenient location for the installation of fiber optic cables. If, in the event of a fire, the fire reaches the plenum area, flames that would otherwise rapidly propagate along non-plenum rated cables are retarded by plenum rated cables. Moreover, plenum rated cables are designed to evolve limited amounts of smoke. Riser rated cables tested to UL 1666 typically do not exhibit acceptable flame spread and smoke evolution results and are therefore unsuitable for plenum use.

The UL 910 test is promulgated by UL in a document entitled: "Test for Flame Propagation and Smoke-Density Values for Electrical and Optical-Fiber Cables Used in Spaces Transporting Environmental Air". A key feature of the UL 910 test is the Steiner Tunnel (horizontal forced air draft) test as modified for communications cables. During the UL 910 test, flame spread values are observed for a predetermined time (20 minutes under the current standard), and smoke is measured by a photocell in an exhaust duct. Data from the photocell measurements are used to calculate peak and average optical density values. Specifically, according to UL 910, the measured flame spread must not exceed five feet, peak smoke (optical) density must not exceed 0.5, and average smoke (optical) density must not exceed 0.15.

In order to meet the foregoing standards, various cable materials for the prevention, inhibition, and/or extinguishment of flame, used in riser or plenum cables, may fall into two general categories. The first category includes inherently inflammable, flame-resistant materials which are thermally stable, and may have high decomposition temperatures, for example, certain metals or high temperature plastics. The materials included in the first category can be useful as thermal/heat/flame barriers. Thermal/heat/flame barriers may have disadvantages, however, as they can be generally expensive and, because of limited burn-performance characteristics, they may be limited to a narrow range of applications. The second general category of materials used for the prevention, inhibition, and/or extinguishment of flame includes inherently flammable materials which have been chemically altered to include flame retardant additives, which additives actively interfere with the chemical reactions associated with combustion. Examples of inherently flammable materials are polyethylene, polypropylene, polystyrene, polyesters, polyurethanes, and epoxy resins. Typical flame retardant additives are aluminum trihydrate, metal hydroxides, tetrabromoethane, chlorinating agents, tetrabromobisphenol, and phosphate compounds. By comparison, thermal/heat/flame barriers typically do not include flame retardant additives, but rather are relied upon in flame protection designs for their resistance to decomposition at high temperatures, or their inherent heat dissipation properties.

An example of a fiber optic cable that requires a thermal barrier, and is designed for use in plenum applications, is disclosed in U.S. Pat. No. 4,941,729, incorporated by reference herein. The thermal barrier is a laminate of a non-flammable metallic material and a plastic material. The thermal barrier is wrapped around conductors so that longitudinally extending edges of the barrier are positioned in overlapping engagement. Although this known fiber optic cable is taught to have thermal/heat resistance, this design has several disadvantages. For example, the thermal barrier is required for flame retardance and requires two layers of material, the collective thicknesses and stiffnesses of which can result in an undesirably heavy and stiff plenum cable. The weight and stiffness can make the cable difficult to route through plenum passageways during installation, and the metal layer of the barrier typically requires grounding during installation. Additionally, the barrier necessarily contributes to manufacturing complexities and the unit cost of the cable.

OBJECTS OF THE INVENTION

It is an object of the present invention to provide a fiber optic cable that is suitable for use in indoor plenum applications, includes structural features that enable the cable to meet mechanical and environmental requirements, is of a low cost, and is easy to install.

BRIEF DESCRIPTION OF THE DRAWING FIGURES

FIG. 1 is an isometric view of a fiber optic cable according to the present invention.

FIG. 2 is an isometric view of a fiber optic cable according to the present invention.

FIG. 3 is a cross sectional view of a tight buffered optical fiber for use in fiber optic cables of the present invention.

FIG. 4 is a cross sectional view of a loose tube configuration according to the present invention.

DETAILED DESCRIPTION OF THE INVENTION

Referring to FIGS. 1–3, fiber optic cables 20,30 according to the present invention will be described. Each fiber optic cable 20,30 includes at least one or more tight buffered optical fibers 10. Fiber optic cable 20 (FIG. 1) can include a dielectric central member 21, a first set of tight buffered optical fibers 10, and a layer of dielectric strength members 23. In addition, fiber optic cable 20 may include a second set of tight buffered optical fibers 10 in a layer 24, a layer of dielectric strength members 25, a ripcord 26, and a cable jacket 27. Strength members 23,25 preferably have a parallel direction of lay and surround tight buffered fibers 10. Fiber optic cable 30 (FIG. 2) includes a dielectric central member 31, buffer tubes 35 including dielectric strength members 33, tight buffered optical fibers 10 unitized in buffer tubes 35, a ripcord 36, and a cable jacket 38. Strength members 33 preferably surround tight buffered fibers 10 and can have a parallel direction of lay.

A typical tight buffered optical fiber 10 (FIG. 3) includes a conventional single mode or multi-mode optical fiber 11 that can be surrounded by a interfacial layer 12. Interfacial layer 12 can be formed of a Teflon® containing material, and is surrounded by a tight buffer layer 13. Release layer 12 advantageously provides a controlled bond between tight buffer layer 13 and optical fiber 11, so that a craftsman can easily strip tight buffer 13 from optical fiber 11 during a termination procedure.

The design of optical fibers 10 can be important because, like other components in cables 20,30, optical fibers 10 ultimately affect the performance of the cables during flame tests for plenum applications. Tight buffer layer 10 is preferably a non-halogenated plastic with low smoke evolution characteristics, having a limiting oxygen index preferably greater than or equal to about 35%, or less preferably having a limiting oxygen index greater than or equal to about 30%. For example, the tight buffer material can be a flame retarded, non-halogenated polyolefin (FRPO), e.g., a flame retarded polyethylene (FRPE) or a flame retarded polypropylene (FRPP). FRPE is typically not a plenum grade material as it has little or no resistance to flame spread above certain temperatures, but it has low smoke evolution characteristics. Other suitable materials include flame retarded EVA, Nylon, and polyesters, e.g., co-polyesters as disclosed in U.S. Pat. No. 4,708,975, U.S. Pat. No. 4,994,549, or U.S. Pat. No. 4,826,899. A suitable flame retardant additive is magnesium hydroxide, and the nominal OD of tight buffered optical fiber 10 can be about 900 $\mu$m.

Central members 21,31 may be formed of a relatively stiff fiber or glass reinforced plastic, or a relatively flexible combination of aramid fibers overcoated with a plastic material. In addition, central members 21,31 may be a flexible bundle of strength members, e.g., aramid fibers not including an overcoating. Jackets 27,28 may be formed of a (plenum grade) flame retarded PVC (FRPVC) having flame retardant and/or smoke suppressant type additives, as disclosed in U.S. Pat. No. 5,698,323. As an alternative to FRPVC, jackets 27,38 may include a fluoro-plastic, e.g., polyvinylidene fluoride (PVDF), a fluoro-compound as disclosed in U.S. Pat. No. 4,963,609, or blends of FRPVC/PVDF may be used.

Fiber optic cables made according to the present invention are suitable for use in plenum applications. A successful UL 910 test was conducted on a fiber optic cable of the present invention which proved the ability of the cable designs to meet the standards for a plenum rated fiber optic cables. More specifically, a fiber optic cable 20 was made substantially as shown in the embodiment of FIG. 1 which was subjected to a UL 910 burn test. The following results were logged during the test: peak optical density=0.31; average optical density=0.13; and flame spread=3 ft. These values are clearly within the requirements of UL 910 for plenum rated fiber optic cables (as described hereinabove).

It is believed that, in addition to the plenum rating, fiber optic cables made according to the present invention advantageously meet Bellcore GR-409-Core requirements with respect to mechanical tests, for example, tensile, compression, cycle flex, and impact tests. In addition, it is believed that fiber optic cables made according to the present invention will pass the GR-409-Core environmental tests, for example, temperature cycling, and cable aging.

The present invention has thus been described with reference to the foregoing embodiments, which embodiments are intended to be illustrative of the inventive concepts rather than limiting. Persons of skill in the art will appreciate that variations and modifications of the foregoing embodiments may be made without departing from the scope of the appended claims. For example, the invention may be practiced in the form of a fiber optic cable having layers of optical fibers separated by a sheath of plastic. In addition, cables made according to the present invention can include one or more buffer tubes 35' (FIG. 4) having one or more optical fibers 11, with or without a color layer, loosely disposed therein in lieu of or in addition to the tight buffered fibers 10 of FIG. 1. Buffer tube 35' can include one or more layers 39 formed of a flame retarded polyolefin material, and buffer tube 35' can be surrounded by a layer of strength members 33. U.S. Pat. No. 4,664,472 discloses a multi-layer buffer tube. All patents mentioned hereinabove are incorporated by reference herein in their respective entireties.

Accordingly, what is claimed is:

1. A fiber optic cable suitable for use in plenum applications, comprising:

at least one optical fiber having a buffer layer formed of a flame retarded polyolefin material, said buffer layer being tightly formed about said optical fiber thereby defining a tight buffer layer;

a layer of strength members; and a cable jacket surrounding said optical fiber and in contact with at least some of said strength members.

2. The fiber optic cable of claim 1, wherein said fiber optic cable includes a central member.

3. The fiber optic cable of claim 2, wherein said central member comprises a flexible bundle of strength members.

4. The fiber optic cable of claim 3, wherein flexible bundle of strength members is overcoated with a plastic material.

5. The fiber optic cable of claim 2, wherein some of said strength members are disposed between said central member and said buffer layer.

6. The fiber optic cable of claim 2, wherein said central member comprises a fiber glass reinforced plastic.

7. The fiber optic cable of claim 1, wherein said flame retarded polyolefin has a limiting oxygen index greater than or equal to about 35%.

8. The fiber optic cable of claim 1, wherein said flame retarded polyolefin has a limiting oxygen index greater than or equal to about 30%.

9. The fiber optic cable of claim 1, wherein said flame retarded polyolefin includes a flame retardant additive.

10. The fiber optic cable of claim 1, wherein said flame retardant additive comprises magnesium hydroxide.

11. The fiber optic cable of claim 1, wherein said tight buffer layer has a nominal OD of about 900 $\mu$m or less.

12. The fiber optic cable of claim 1, wherein said flame retarded polyolefin is selected from the group consisting of a flame retarded polyethylene, a flame retarded polypropylene, and blends thereof.

13. The fiber optic cable of claim 1, wherein said strength members substantially encircle said tight buffer layer.

14. The fiber optic cable of claim 1, wherein said strength members comprise a parallel direction of lay relative to a center of said fiber optic cable.

15. The fiber optic cable of claim 1, wherein said optical fiber and strength members are disposed in a buffer tube.

16. The fiber optic cable of claim 1, wherein said strength members comprise aramid fibers.

17. The fiber optic cable of claim 1, wherein said cable jacket includes a flame retardant additive.

18. The fiber optic cable of claim 1, wherein said cable conforms to UL 910 such that flame spread does not exceed five feet, peak smoke (optical) density does not exceed 0.5, and average smoke (optical) density does not exceed 0.15.

19. The fiber optic cable of claim 1, wherein said cable conforms to Bellcore GR-409-Core such that it meets tensile, compression, cycle flex, and impact tests.

20. A fiber optic cable suitable for use in plenum applications, comprising:

said fiber optic cable includes a central member;

a layer of strength members;

at least one optical fiber having a buffer layer formed of a flame retarded polyolefin material, some of said strength members are disposed between said central member and said buffer layer; and a cable jacket surrounding said optical fiber and in contact with at least some of said strength members.

21. A fiber optic cable suitable for use in plenum applications, comprising: a central member;

at least one optical fiber having a buffer layer formed of a flame retarded polyolefin material, said central member comprises a fiberglass reinforced plastic;

a layer of strength members; and a cable jacket surrounding said optical fiber and in contact with at least some of said strength members.

22. A fiber optic cable suitable for use in plenum applications and not including a metal-plastic laminate thermal barrier, said fiber optic cable comprising:

at least one optical fiber having a buffer layer formed of a flame retarded polyolefin material, said buffer layer comprising a buffer tube loosely receiving said optical fiber;

a layer of strength members; and a cable jacket surrounding said optical fiber and said strength members.

23. A fiber optic cable suitable for use in plenum applications, comprising:

at least one optical fiber having a buffer layer formed of a flame retarded polyolefin material;

a layer of strength members; and a cable jacket surrounding said optical fiber and in contact with at least some of said strength members, said optical fiber and strength members being disposed in a buffer tube.

* * * * *